US008350875B2

(12) United States Patent
Kim

(10) Patent No.: US 8,350,875 B2
(45) Date of Patent: Jan. 8, 2013

(54) MOBILE TERMINAL EMITTING LIGHT ACCORDING TO TEMPERATURE AND DISPLAY CONTROL METHOD THEREOF

(75) Inventor: Kun-Hyoung Kim, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 685 days.

(21) Appl. No.: 12/229,035

(22) Filed: Aug. 19, 2008

(65) Prior Publication Data

US 2009/0051713 A1 Feb. 26, 2009

(30) Foreign Application Priority Data

Aug. 21, 2007 (KR) ........................ 10-2007-0084092

(51) Int. Cl.

| | |
|---|---|
| ***G09G 5/10*** | (2006.01) |
| ***G02F 1/1335*** | (2006.01) |
| ***G05D 23/00*** | (2006.01) |
| ***B23K 11/24*** | (2006.01) |
| ***F25B 49/00*** | (2006.01) |

(52) U.S. Cl. ........ 345/690; 349/113; 700/300; 307/112; 62/126

(58) Field of Classification Search .................. 345/107, 345/690, 204
See application file for complete search history.

(56) References Cited

U.S. PATENT DOCUMENTS

| | | | | |
|---|---|---|---|---|
| 6,226,996 | B1 * | 5/2001 | Weber et al. | 62/126 |
| 7,173,377 | B2 * | 2/2007 | Park et al. | 315/169.1 |
| 7,205,975 | B2 * | 4/2007 | Kim | 345/102 |
| 2001/0048247 | A1 * | 12/2001 | Bae et al. | 307/112 |
| 2003/0212474 | A1 * | 11/2003 | Pippin | 700/300 |
| 2007/0206137 | A1 * | 9/2007 | Akiyama | 349/113 |

FOREIGN PATENT DOCUMENTS

JP 2002095517 A * 4/2002

* cited by examiner

*Primary Examiner* — Alexander Eisen
*Assistant Examiner* — Amit Chatly

(57) ABSTRACT

A mobile terminal emitting light according to a temperature and a display control method thereof are provided. The mobile terminal includes a display part activated in response to a control signal, a temperature sensor part for measuring a temperature of the mobile terminal and outputting a voltage corresponding to the measured temperature value, and a central controller for outputting the control signal to activate the display part included in the mobile terminal when the voltage input from the temperature sensor part exceeds a predetermined reference value. Therefore, it is possible to improve the design of the mobile terminal.

20 Claims, 4 Drawing Sheets

MOBILE TERMINAL EMITTING LIGHT ACCORDING TO TEMPERATURE AND DISPLAY CONTROL METHOD THEREOF

CROSS-REFERENCE TO RELATED APPLICATION(S) AND CLAIM OF PRIORITY

The present application claims the benefit under 35 U.S.C. §119 (a) from an application entitled "MOBILE TERMINAL EMITTING LIGHT ACCORDING TO TEMPERATURE AND DISPLAY CONTROL METHOD THEREOF" filed on Aug. 21, 2007 and assigned Serial No. 2007-0084092, the entire contents of which are hereby incorporated herein by reference.

TECHNICAL FIELD OF THE INVENTION

The present invention relates to a mobile terminal emitting light according to a temperature and a display control method thereof, and more particularly, to a mobile terminal displaying a fade-in or fade-out effect using an electroluminescent sheet depending on a range to which the current temperature belongs.

BACKGROUND OF THE INVENTION

In 21st century digital environments, information and communication technology is rapidly changed. A part of the digital era is the "ubiquitous network." The ubiquitous network makes a new industrial revolution converging information technology fields.

A device, which can play an important role in the ubiquitous environments, may be a mobile phone, one of network appliances such as personal digital assistants (PDA), personal computers (PC), and so forth. While it is still insufficient to classify the mobile phone as a mobile computer, the mobile phone will have high performance similar to the PC in near future.

However, it will be apparent to everyone that the external design of the mobile phone also is very important, as well as the technical performance of the mobile phone. In recent times, a peculiar design, which is against common sense, has been proposed. A horizontal LCD appears instead of a vertical LCD, which was referred to as a basic type. Moreover, unique designs, which break from the convention, are proposed largely in response to the digital multimedia broadcasting (DMB) era.

SUMMARY OF THE INVENTION

To address the above-discussed deficiencies of the prior art, it is a primary object of the present invention to provide a mobile terminal capable of measuring a temperature thereof using an electroluminescent sheet and a temperature sensor, and supplying power to the electroluminescent sheet depending on the measured temperature to emit light to thereby obtain a shine effect, and a display control method thereof.

A first aspect of the present invention provides a mobile terminal including: a display part activated in response to a control signal, a temperature sensor part for measuring a temperature of the mobile terminal and outputting a voltage corresponding to the measured temperature value, and a central controller for outputting the control signal to activate the display part included in the mobile terminal when the voltage input from the temperature sensor part exceeds a predetermined reference value.

In this case, the display part may include an electroluminescent sheet for emitting at least one color, and an electroluminescent driver for controlling the electroluminescent sheet. In this case, the electroluminescent driver may include a low drop out (LDO) part for receiving a luminescent diode (LED) control signal through a general purpose input output (GPIO) terminal from the central controller and outputting a constant voltage; and an electroluminescent sheet driver for applying a signal to drive the electroluminescent sheet depending on the voltage output from the LDO part.

The central controller may output control signals of different pulse width modulation (PWM) patterns depending on a range to which the voltage input from the temperature sensor part belongs. In this case, the display part may emit light in a fade-in or a fade-out pattern depending on the PWM control signals output from the central controller.

In addition, the central controller may output a control signal to activate the display part to thereby reduce malfunction when the mobile terminal is busy and the voltage value input from the temperature sensor part exceeds the predetermined reference value.

A second aspect of the present invention provides a display control method of a mobile terminal including the steps of: measuring a temperature of the mobile terminal using a temperature sensor part; and emitting light through a display part included in the mobile terminal when the temperature of the mobile terminal measured by the temperature sensor part exceeds a predetermined reference value.

The display part may include an electroluminescent sheet for emitting at least one color, and an electroluminescent driver for controlling the electroluminescent sheet.

In addition, the display control method may further include the step of determining whether the temperature measured by the temperature sensor belongs to a certain range, and emitting light in a fade-in or fade-out pattern depending on the measured temperature.

Finally, the display control method may further include the step of determining whether the mobile terminal is busy, wherein the display part can be activated only when the mobile terminal is busy and the temperature measured by the temperature sensor part exceeds a predetermined reference value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

Figure 1:
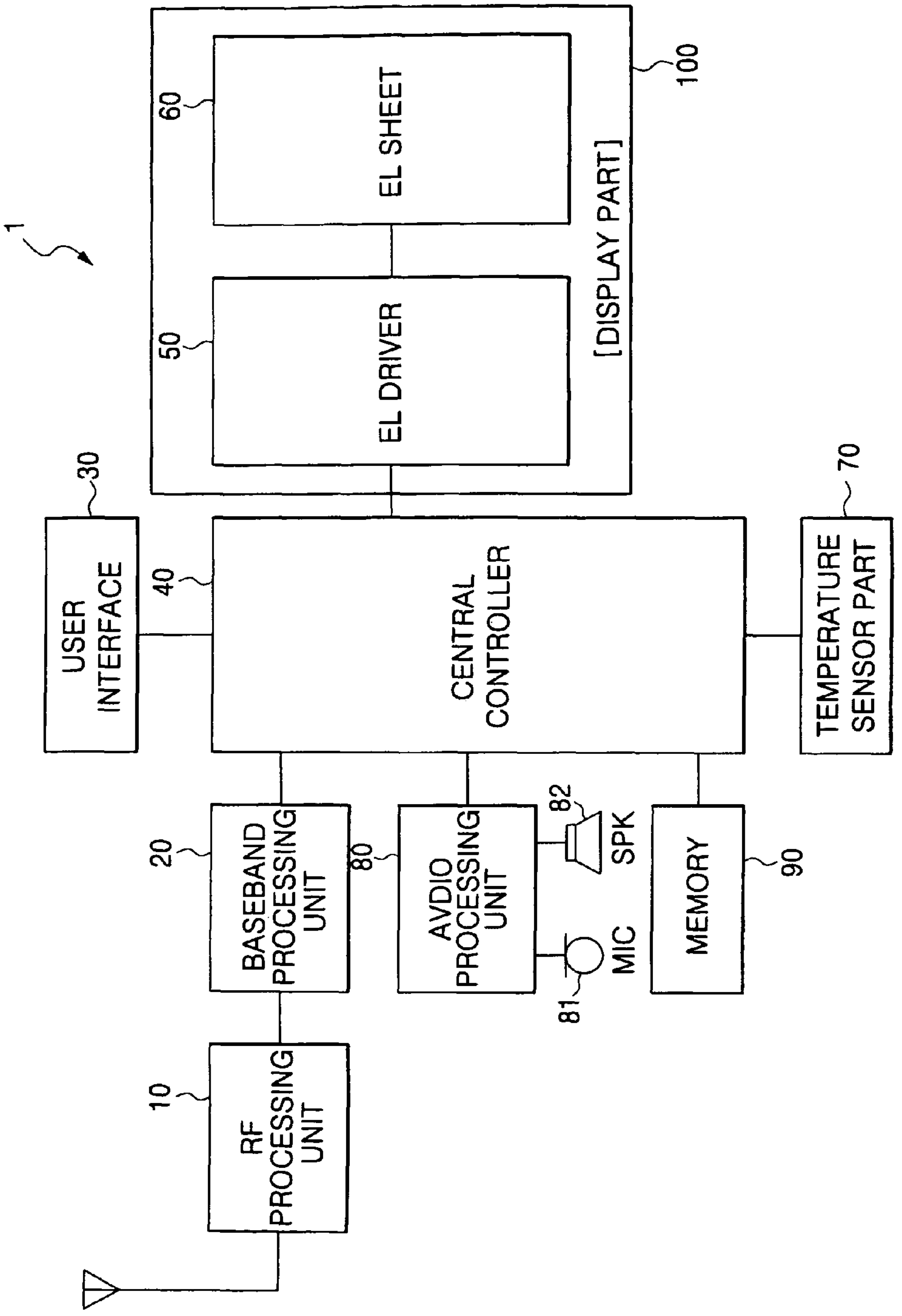
FIG. 1 is a block diagram of a mobile terminal in accordance with an exemplary embodiment of the present invention.

FIG. 1 is a block diagram of a mobile terminal in accordance with an exemplary embodiment of the present invention.

As shown in FIG. 1, the mobile terminal 1 includes a display part 100 including an electroluminescent (EL) driver 50, an electroluminescent (EL) sheet 60, a radio frequency (RF) processor 10, a baseband processing unit 20, a user interface 30, a central controller 40, a temperature sensor part 70, an audio processing unit 80, a memory 90, and so forth.

In this exemplary embodiment, while the mobile terminal 1 is described as a mobile communication terminal, the mobile terminal 1 is not limited thereto. The mobile terminal 1 may be applied to a terminal that can be carried by a user, for example, a PDA, a portable multimedia player (PMP), an MPEG audio-layer 3 (MP3) player, and so forth.

First, the temperature sensor part 70 measures a temperature of the mobile terminal 1 and outputs a value corresponding to the measured temperature or a voltage to the central controller 40.

A temperature sensor generally used in the temperature sensor part 70 is classified as a contact type or a non-contact type. The contact type temperature sensor measures a temperature through contact with an object to be measured, which includes a (platinum) resistance temperature sensor, a thermistor, a thermocouple, a bimetal, and so forth. The non-contact type temperature sensor includes a radiation thermometer (or radiometer), an optical pyrometer, and so forth. The temperature sensor part 70 of the mobile terminal 1 in accordance with the present invention employs one of the temperature sensors to measure the temperature of the mobile terminal 1 and to output a value or a voltage corresponding thereto to the central controller 40.

The central controller 40 performs the general control operation of the mobile terminal 1. For example, the central controller 40 controls general operations of the mobile communication terminal such as call and data transmission/reception using the mobile terminal 1. In particular, the central controller 40 transmits a luminescent diode (LED) enable signal to the EL driver 50 of the display part 100 to emit light through the electroluminescent sheet 60 of the display part 100 of the mobile terminal 1 when the voltage value input from the temperature sensor part 70 exceeds a predetermined reference value.

In general, when the mobile terminal 1 is used, heat is generated from the mobile terminal 1, which increases the temperature of the mobile terminal 1. When the temperature of the mobile terminal 1 is increased, the central controller 40 determines that the mobile terminal 1 is currently used and controls the light emitted through the electroluminescent sheet 60 of the display part 100.

In this case, the central controller 40 can generate various kinds of pulse width modulation (PWM) signals depending on the temperature of the mobile terminal 1 transmitted from the temperature sensor part 70 and transmits the signals to the EL driver 50 of the display part 100. In this case, the EL driver 50 of the display part 100 can drive the electroluminescent sheet 60 of the display part 100 in a fade-in or fade-out pattern depending on the transmitted PWM signal. Eventually, the mobile terminal 1 in accordance with the present invention can obtain a unique display effect depending on the temperature.

In addition, the central controller 40 may simultaneously check a call state of the mobile terminal 1 as well as the temperature of the mobile terminal 1. The reason for this is to prevent the mobile terminal 1 existing in a high temperature state from erroneously emitting light when the electroluminescent sheet 60 of the display part 100 is driven by measuring the temperature of the mobile terminal 1 only.

Accordingly, the central controller 40 may be designed to transmit an LED enable signal or a PWM signal to the EL driver 50 of the display part 100 when the mobile terminal 1 is busy and the temperature exceeds a predetermined reference value.

The EL driver 50 of the display part 100 is an element for operating the electroluminescent sheet 60 of the display part 100 included in the mobile terminal 1. The EL driver 50 of the display part 100 performs an operation of driving the electroluminescent sheet 60 of the display part 100 when the LED enable signal is received from the central controller 40.

Here, EL refers to a kind of electronic emission (i.e., a phenomenon that light is emitted when a current is applied to a material such as phosphor, gallium arsenic, or the like). The electroluminescent sheet 60 of the display part 100 of the mobile terminal 1 in accordance with the present invention also uses the electronic emission of the EL, which may be a paper type EL, a linear EL, or the like.

The user interface 30 is an interface device for receiving a command from a user, or outputting the current state of the terminal. The user interface 30 may include a plurality of alphanumeric keys, function keys, and so forth. When the user inputs a control command by pushing the keys, the user interface 30 transmits the input key value to the central controller 40.

In particular, the user interface 30 can receive a command for controlling activation or deactivation of a light emitting function of the mobile terminal 1 depending on the temperature. When the light emitting function activation/deactivation command is input, the central controller 40 activates or deactivates the light emitting function depending on the temperature according to the input command.

The memory 90 connected to the central controller 40 is an element for storing a plurality of programs and various data required upon operational control of the mobile terminal 1. Of course, the memory 90 may include a control program for transmitting an LED enable signal depending on the temperature.

The RF processing unit 10 converts the RF signal received through an antenna into an intermediate frequency (IF) signal and then outputs the IF signal to the baseband processing unit 20. Conversely, the RF processing unit 10 also converts the IF signal input from the baseband processing unit 20 into the RF signal and transmits the RF signal through the antenna.

The baseband processing unit 20 converts data of a base bandwidth received from the central controller 40 into the IF signal and applies the IF signal to the RF processing unit. Conversely, the baseband processing unit 20 converts the IF signal received from the RF processing unit 10 into digital data of a base bandwidth and transmits the digital data to the central controller 40.

The audio processing unit 80 is connected to a microphone 81 and a speaker 82. The audio processing unit 80 converts a sound signal input through the microphone 81 into digital audio data and transmits the digital audio data to the central controller 40. In addition, the audio processing unit 80 converts the digital audio data transmitted from the central controller 40 into analog audio data and transmits the analog audio data to the speaker 82.

Figure 2:
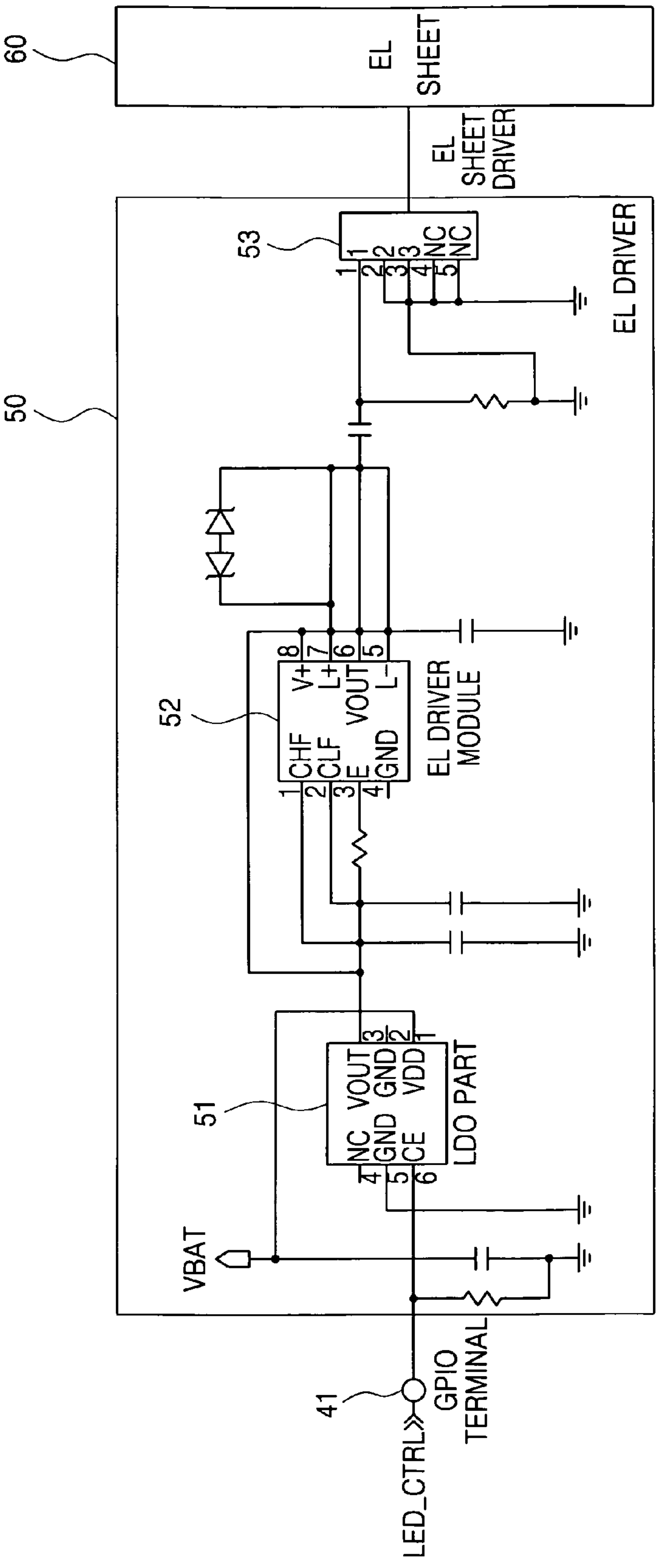
FIG. 2 is a circuit diagram of an electroluminescent driver included in the mobile terminal of FIG. 1.

FIG. 2 is a circuit diagram of an electroluminescent driver included in the mobile terminal 1 of FIG. 1.

As shown in FIG. 2, the EL driver 50 includes a low drop out (LDO) part 51, an EL driver module 52, and an electroluminescent sheet driver 53.

The LDO part 51 receives an LED enable signal from a general purpose input output (GPIO) terminal 41 of the central controller 40. Here, the GPIO terminal 41 refers to an input or output port prepared for general purpose in a processor or a controller. In general, additional GPIO terminals exist in the central controller 40 of the mobile terminal 1, and the GPIO terminal 41 shown in FIG. 2 corresponds to one of the GPIO terminals.

The LED enable signal input through the GPIO terminal 41 is input into one terminal of the LDO part 51 (a CE terminal of FIG. 2). The LDO part 51 transmits a constant voltage to the EL driver module 52 through a Vout terminal, when the LDO part 51 receives the LED enable signal.

The EL driver module 52 transmits an electroluminescent sheet control signal according to a constant voltage received from the LDO part 51 to the electroluminescent sheet driver 53.

Finally, when the electroluminescent sheet control signal is applied to the electroluminescent sheet driver 53, the electroluminescent sheet driver 53 supplies a voltage to emit light through the EL element included in the electroluminescent sheet 60.

As described above, control of the light emitted through the electroluminescent sheet 60 of the mobile terminal 1 has been described. As described with reference to FIG. 1, the present invention can obtain various EL display effects using the PWM signal. Hereinafter, operation of the EL driver for this purpose will be described.

Here, the PWM signal refers to a pulse width modulation signal. Pulse width modulation (PWM) refers to a method of varying a width of a pulse depending on the size of a modulation signal to modulate a signal. The central controller 40 of FIG. 1 can output the LED enable signal in a PWM pattern corresponding to the temperature input from the temperature sensor part 70 through the GPIO terminal 41. Here, the LED enable signal in the PWM pattern may be referred to as a PWM control signal.

The PWM control signal output through the GPIO terminal 41 is transmitted to the EL driver module 52 through the LDO part 51. In this case, the EL driver module 52 can adjust the timing, period, and so forth, of the electroluminescent sheet control signal output to the electroluminescent sheet driver 53 depending on the PWM control signal.

For example, when a first PWM control signal is transmitted, the EL driver module 52 can apply the electroluminescent sheet control signal to the electroluminescent sheet driver 53 in each period of T1. Also, when a second PWM control signal is transmitted, the EL driver module 52 applies a voltage to the electroluminescent sheet driver 53 in each period of T2 to obtain a display effect different from the first PWM mode.

Further, by varying a voltage supplied to the electroluminescent sheet 60 depending on the PWM control signal output from the central controller 40, it is possible to implement a fade-in effect such that the brightness of the electroluminescent sheet 60 is gradually increased, a fade-out effect such that the brightness of the electroluminescent sheet 60 is gradually decreased, or the like.

Figure 3:
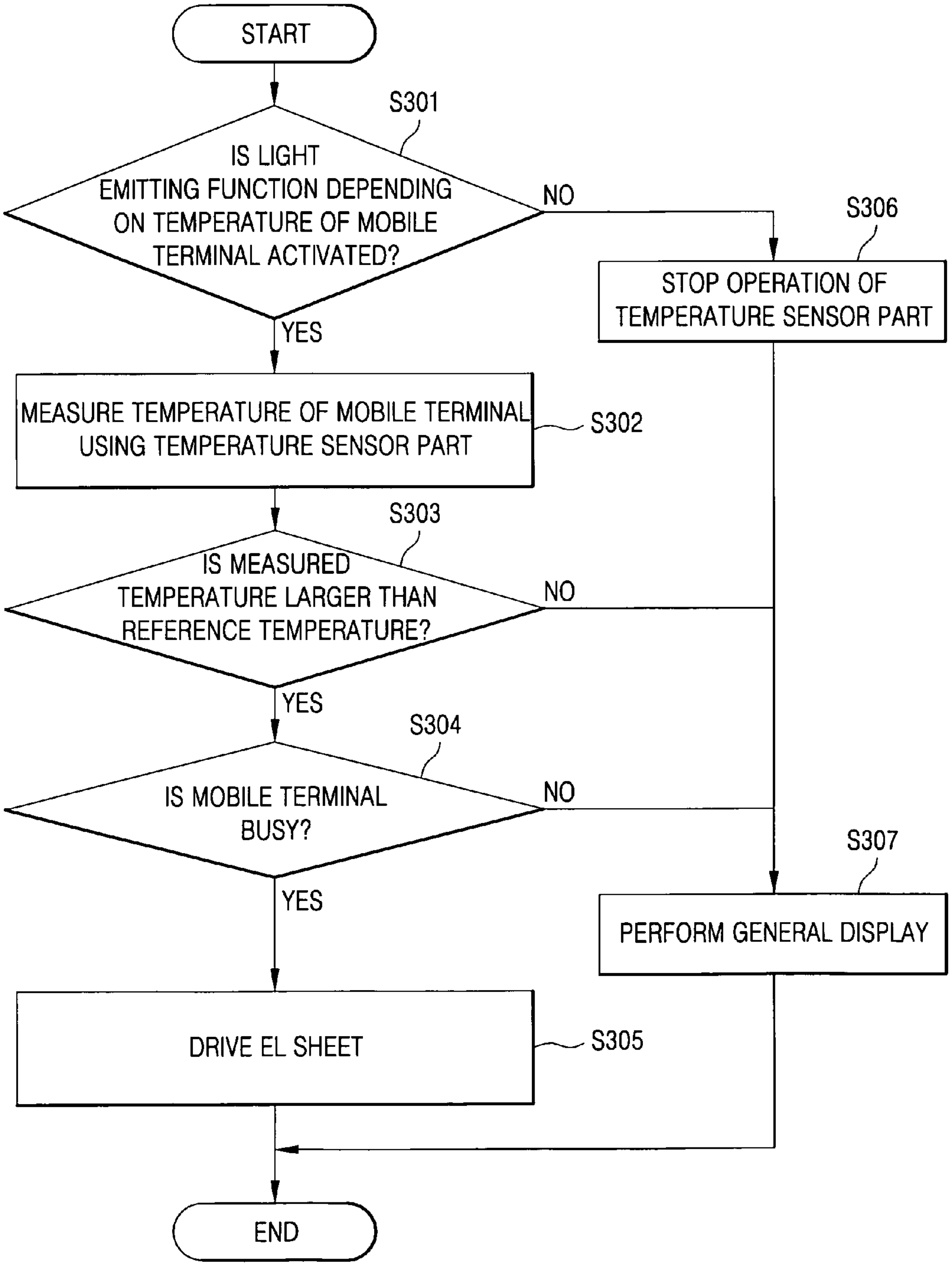
FIG. 3 is a flowchart showing a display control method of a mobile terminal in accordance with another exemplary embodiment of the present invention.

FIG. 3 is a flowchart showing a display control method of a mobile terminal in accordance with another exemplary embodiment of the present invention.

First, the mobile terminal 1 checks whether a light emitting function depending on a temperature is activated (S301). Activation or deactivation of the light emitting function depending on the temperature can be arbitrarily set by a user using a user interface 30 of the mobile terminal 1 as described in FIG. 1.

When the light emitting function of the mobile terminal 1 depending on the temperature is deactivated as a result of step S301, the mobile terminal 1 stops the operation of the temperature sensor part 70 (S306), and performs a general display operation (S307).

When the light emitting function of the mobile terminal 1 depending on the temperature is activated as a result of step S301, the mobile terminal 1 measures a current temperature of the mobile terminal 1 using the temperature sensor part 70 (S302). Then, the mobile terminal 1 checks whether the measured current temperature exceeds a predetermined reference value (S303).

When the current temperature of the mobile terminal 1 is lower than the predetermined reference value as a result of step S303, the mobile terminal 1 performs a general display (S307), not driving the electroluminescent sheet 60.

When the current temperature measured in step S303 exceeds the predetermined reference value, the mobile terminal 1 checks whether the mobile terminal 1 is busy (S304). When the mobile terminal 1 is busy, the mobile terminal 1 performs control for driving the electroluminescent sheet 60 (S305).

When the mobile terminal 1 is not busy, the mobile terminal 1 determines that the mobile terminal 1 is simply located at a high temperature place, and performs a general display (S307), not driving the electroluminescent sheet 60.

Figure 4:
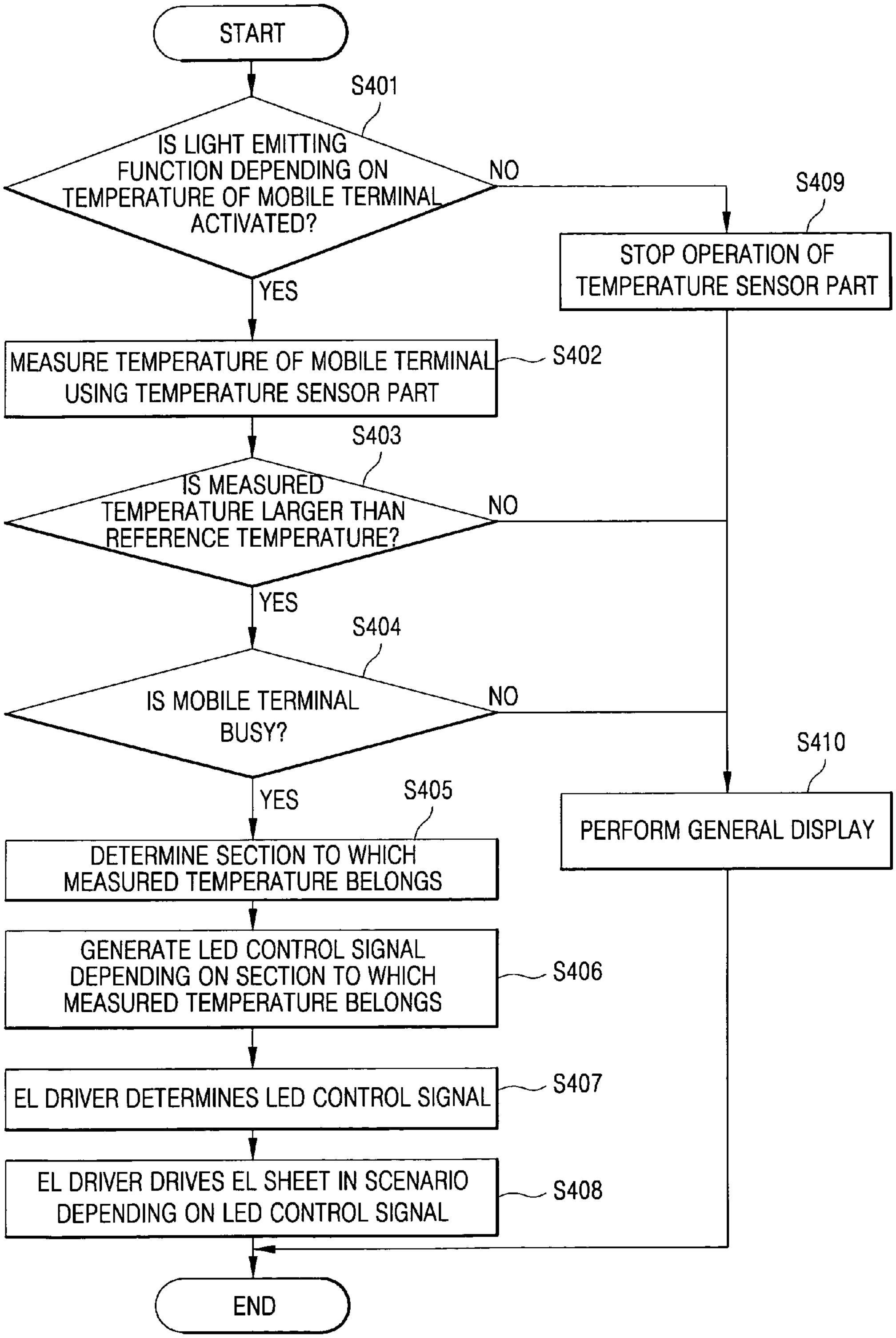
FIG. 4 is a flowchart showing a display control method of a mobile terminal in accordance with still another exemplary embodiment of the present invention.

FIG. 4 is a flowchart showing a display control method of a mobile terminal in accordance with still another exemplary embodiment of the present invention.

FIG. 4 shows a control method capable of obtaining different display effects depending on a measured temperature.

Since steps S401 to S404 are similar to steps S301 to S304 of FIG. 3, a description thereof will not be repeated. The mobile terminal 1 goes to step S405 when an activation condition of the light emitting function depending on a temperature and a call busy condition are satisfied.

The mobile terminal 1 checks a temperature section, to which the currently measured temperature belongs (S405). The mobile terminal 1 generates different LED enable signals depending on the temperature section (S406). In this case, the respective LED enable signals may be modulated and classified in a PWM pattern.

The EL driver 50 of the mobile terminal 1 receives the LED enable signal in the PWM pattern, and determines the kind of the input LED enable signal (S407). The EL driver 50 drives an electroluminescent sheet in various scenarios such as a fade-in or fade-out pattern, and so on, depending on the LED enable signal (S408).

As can be seen from the foregoing, since a mobile terminal emitting light according to a temperature can measure the temperature of the mobile terminal using a temperature sensor to obtain a light emitting effect through an electroluminescent sheet, it is possible to implement splendorous design of the mobile terminal. In addition, in the dark, the light emitting effect of the electroluminescent sheet allows recognition of a user's position by another people to obtain an additional effect such as a user's safety.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile terminal comprising:

a display part configured to perform a general display, the display part comprising an electroluminescent sheet configured to emit light;

a temperature sensor part configured to measure a temperature of the mobile terminal and output a voltage corresponding to the measured temperature value; and a central controller configured to output a control signal to perform a general display without driving the electroluminescent sheet when the voltage from the temperature sensor part indicates that the measured temperature value is not higher than a predetermined reference value, and drive the electroluminescent sheet when the voltage from the temperature sensor part indicates that the measured temperature value is higher than a predetermined reference value.

2. The mobile terminal according to claim 1, wherein the display part further comprises:

an electroluminescent driver configured to control the electroluminescent sheet, wherein the electroluminescent sheet is further configured to emit at least one color.

3. The mobile terminal according to claim 2, wherein the electroluminescent driver comprises:

a low drop out (LDO) part configured to receive a luminescent diode (LED) control signal through a general purpose input output (GPIO) terminal from the central controller and output a constant voltage; and an electroluminescent sheet driver configured to apply a signal to drive the electroluminescent sheet depending on the voltage output from the LDO part.

4. The mobile terminal according to claim 1, wherein the central controller is further configured to output control signals of different pulse width modulation (PWM) patterns depending on a range to which the voltage input from the temperature sensor part belongs.

5. The mobile terminal according to claim 4, wherein the display part is further configured to emit light in one of a fade-in and a fade-out pattern depending on the PWM control signals output from the central controller.

6. The mobile terminal according to claim 1, wherein the central controller is further configured to output the control signal to drive the electroluminescent sheet when the mobile terminal is busy and the voltage from the temperature sensor part indicates that the measured temperature value is higher than the predetermined reference value.

7. A display control method of a mobile terminal, comprising:

measuring a temperature of the mobile terminal using a temperature sensor part;

generating a control signal based on the measured temperature;

performing a general display using a display part included in the mobile terminal without driving an electroluminescent sheet when the control signal indicates that the measured temperature is not higher than a predetermined reference value; and driving the electroluminescent sheet to emit light according to the control signal when the control signal indicates that the measured temperature exceeds a predetermined reference value.

8. The display control method according to claim 7, further comprising:

determining whether the mobile terminal is in a temperature-controlled light emission mode, wherein the temperature of the mobile terminal is measured when the mobile terminal is in the temperature-controlled light emission mode.

9. The display control method according to claim 7, wherein emitting light according to the control signal comprises:

determining whether the control signal indicates that the measured temperature is within a certain range; and emitting light in one of a fade-in and fade-out pattern when the measured temperature is within the certain range.

10. The display control method according to claim 7, further comprising determining whether the mobile terminal is busy, wherein generating the control signal comprises:

generating the control signal when the mobile terminal is busy and when the control signal indicates that the measured temperature exceeds the predetermined reference value.

11. The display control method of claim 7, further comprising:

identifying a section where the measured temperature was measured from, wherein generating the control signal based on the measured temperature comprises:

generating the control signal based on the section where the measured temperature was measured from.

12. The display control method of claim 7, wherein generating the control signal comprises:

determining a temperature range to which the measured temperature belongs; and generating the control signal according to the corresponding temperature range.

13. The display control method of claim 12, wherein the control signal comprises a pulse width modulation (PWM) pattern according to the corresponding temperature range.

14. An apparatus of a mobile device comprising:

an electroluminescent (EL) sheet of a display part configured to emit light;

a temperature sensor configured to measure a temperature of the mobile terminal; and a controller configured to output a control signal to control the display part without driving the EL sheet when the voltage from the temperature sensor part indicates that the measured temperature value is not higher than a predetermined reference value, and control the display part to drive the EL sheet when the measured temperature value is higher than a predetermined reference value.

15. The apparatus of claim 14, wherein the EL sheet is further configured to emit light in at least one color, and the display part comprises:

the EL sheet; and an EL driver configured to control the EL sheet.

16. The apparatus of claim 15, wherein the EL driver comprises:

a low drop out (LDO) part configured to receive the control signal from the controller and output a constant voltage control signal;

an EL driver module configured to output an EL sheet control signal to adjust at least one of a timing, period, and color according to the constant voltage control signal; and an EL sheet driver configured to drive the EL sheet based on the voltage of the EL sheet control signal.

17. The apparatus of claim 16, wherein the LDO part is further configured to output constant voltage control signals as pulse width modulation (PWM) signals for different PWM patterns that correspond to a plurality of temperature ranges.

18. The apparatus of claim 17, wherein the EL driver module is further configured to control the EL sheet to emit light in one of a fade in and a fade out pattern based on the PWM signal from the LDO part.

19. The apparatus of claim 14, wherein the controller is further configured to output the control signal to drive the EL sheet when the mobile terminal is busy and when the measured temperature value is higher than the predetermined reference value.

20. The apparatus of claim 17, wherein the controller is further configured to determine a temperature range to which the measured temperature belongs, and generate the control signal according to the corresponding temperature range.

* * * * *

UNITED STATES PATENT AND TRADEMARK OFFICE

CERTIFICATE OF CORRECTION

PATENT NO. : 8,350,875 B2
APPLICATION NO. : 12/229035
DATED : January 8, 2013
INVENTOR(S) : Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this
Second Day of December, 2014

Michelle K. Lee
*Deputy Director of the United States Patent and Trademark Office*